United States Patent [19]

Scott et al.

[11] Patent Number: 5,282,228

[45] Date of Patent: Jan. 25, 1994

[54] TIMING AND AUTOMATIC FREQUENCY CONTROL OF DIGITAL RECEIVER USING THE CYCLIC PROPERTIES OF A NON-LINEAR OPERATION

[75] Inventors: Kenneth E. Scott; Michael Kaube, both of Calgary, Canada; Kiomars Anvari, Walnut Creek, Calif.

[73] Assignee: NovAtel Communications Ltd., Calgary, Canada

[21] Appl. No.: 804,424

[22] Filed: Dec. 9, 1991

[51] Int. Cl.[5] .................................. H04L 27/06
[52] U.S. Cl. ................................. 375/97; 329/306
[58] Field of Search .................. 375/97, 94, 80, 81, 375/93; 329/304, 345, 346, 306, 307; 331/1 R; 455/164.1

[56] References Cited

U.S. PATENT DOCUMENTS

| | | | |
|---|---|---|---|
| 4,079,329 | 3/1978 | England et al. | 375/81 X |
| 4,466,108 | 8/1984 | Rhodes | 375/97 X |
| 4,871,925 | 10/1989 | Nawata et al. | 375/81 X |
| 5,115,454 | 5/1992 | Kucar | 375/81 X |

Primary Examiner—Curtis Kuntz
Assistant Examiner—Tesfaldet Bocure
Attorney, Agent, or Firm—Cesari and McKenna

[57] ABSTRACT

A technique for correcting the sampling time and carrier frequency error in a receiver for digitally modulated signals. Discrete-time, complex-valued samples of the incoming signal are fed to a pair of non-linear operators such as correlators. The first correlator provides a signal having a first phase component related to the symbol timing error and a second phase component related to the carrier frequency error. The second correlator provides a signal having a first phase component related to the symbol timing error and a second phase component related to the negative of the carrier frequency error. The phase components are then separated and detected to extract an estimate of the symbol timing error and the carrier frequency error. In the preferred embodiment, the complex-valued samples are frequency-shifted, before being fed to the correlators, so that the phase components of interest appear at zero frequency. The invention satisfactorily demodulates transmitted digital signals in applications, such as cellular time-division multiple access (TDMA), where they are susceptible to multipath fading.

12 Claims, 6 Drawing Sheets

TIMING AND AUTOMATIC FREQUENCY CONTROL OF DIGITAL RECEIVER USING THE CYCLIC PROPERTIES OF A NON-LINEAR OPERATION

FIELD OF THE INVENTION

This invention relates generally to radio receivers, and particularly to a receiver which automatically corrects the frequency of a local reference oscillator and the timing of a sampling circuit used to sample an incoming digital modulated signal.

BACKGROUND OF THE INVENTION

Communication through the use of modulated digital signals continues to find new and wider application. For example, explosive growth in the use of mobile radio telephones has lead to the adoption of time division multiple access (TDMA) cellular signalling standards, which allow several users to share one radio frequency carrier signal. A transmitted TDMA cellular signal typically consists of an audio signal which has been converted to discrete-time, or digital, symbols. The digital symbols are compressed in time and then typically phase- or amplitude-encoded by quarternary phase-shift keying (QPSK) or quadrature amplitude modulation (QAM). The encoded digital signal is then radio-frequency modulated and is often transmitted in bursts during time slots which have been pre-allocated to each transmitter.

Carrier frequency recovery and symbol timing synchronization and are two of the most critical functions performed by any digital signal receiver In order to properly demodulate any incoming radio frequency signal, the phase and frequency of the carrier signal must be accurately tracked by a local oscillator. In addition, if the incoming signal is digitally modulated, a sampling clock in the receiver should be adjusted continuously in order to maximize the probability of correctly detecting the digital symbols. Accurate recovery of symbol timing information can be particularly difficult in certain applications. such as TDMA cellular, where the radio frequency signal has been subjected to sharp roll-off filtering in order to minimize spectral overlap in adjacent frequency bands.

Most present-day receivers use continuous-time methods for carrier recovery and symbol synchronization. For example, carrier frequency information is typically recovered through the use of a phase-locked loop, and symbol timing information is derived by bandpass filtering the demodulated signal, or other analog techniques.

Certain discrete-time correction techniques have recently been proposed by others. See, for example, U.S. Pat. No. 4,977,580 issued to McNichol, and assigned to Northern Telecom Limited. The technique shown in that patent is to estimate a symbol timing error by interpolating successive samples of the incoming signal. A carrier phase error is then estimated from the symbol phase error. The sampling rate required for such techniques to adequately operate is typically much greater than the symbol rate.

However, these known techniques have been found to be less than satisfactory in certain environments, such as large cities, where TDMA signals are quite susceptible to fast multipath fading.

Other principles of communication theory are of interest as well. In particular, the article by Gardner, William, A., entitled "Exploitation of Spectral Redundancy in Cyclostationary Signals", *IEEE Signal Processing Magazine,* April 1991, pp. 14–36, explains that most signal processing detection methods treat the incoming signal as though it were stationary, in which case the underlying parameters of the physical mechanism which generated the signal do not vary with time. However, as the article points out, most man-made signals, such as periodic modulated carrier signals, are cyclostationary, in that they exhibit second-order periodicities. These second-order properties can be determined by the use of so-called cyclic correlation, which introduces a cyclic weighting factor in a conventional correlation calculation. The Gardner article also points out that certain types of digitally modulated signals, such as the QPSK and QAM signals used in TDMA systems, exhibit second-order periodicity when they undergo a non-linear transformation, like a signal squarer. However, that article does not explain how these periodicities can be exploited to perform carrier recovery and symbol synchronization efficiently.

What is needed is a discrete-time technique for carrier frequency recovery and symbol timing which can adequately tolerate fading and other channel impairments. The technique should be capable of correcting frequency offset and sampling time in as short a time as possible, so that it may be used in certain types of digital signal receivers, such as those used in TDMA cellular systems, which may need to reacquire synchronization at the beginning of each burst. The sampling rate of the carrier recovery and symbol timing technique should also be as small as possible, to minimize the cost and complexity of the receiver.

SUMMARY OF THE INVENTION

Briefly, the invention is a technique for correcting the sampling time and carrier frequency error in a receiver for digitally modulated signals. The incoming signal is first complex-demodulated by a local reference oscillator and discrete-time sampled. The complex-valued samples are then fed to a pair of non-linear operators such as cyclic correlators. The first correlator provides a signal having a first phase component related to the symbol timing error and a second phase component related to the carrier frequency error. The second correlator provides a signal having a first phase component related to the symbol timing error and a second phase component related to the negative of the carrier frequency error. These phase components are then separated and detected to extract an estimate of the symbol timing error and the carrier frequency error. The frequency error estimate is used to adjust the phase of future complex-valued samples before they are fed to the correlators, and the symbol timing error estimate is used to adjust a sampling clock which determines when the discrete-time samples of the incoming signal are taken.

In the preferred embodiment, the complex-valued samples are frequency-shifted before being fed to the correlators, so that the phase components of interest appear at or near zero frequency (DC). This, in turn, greatly reduces the sampling rate which would otherwise be required to avoid aliasing in the correlator outputs.

The technique has been found to perform satisfactorily in fast fading, multipath environments, and to provide symbol timing synchronization in less than 500 symbol periods and carrier frequency lock in less than 1000 symbol periods. Since the sampling rate can be at or near the Nyquist rate, oversampling is not necessary, and the entire system is less expensive.

BRIEF DESCRIPTION OF THE DRAWINGS

The novel features and advantages believed to be characteristic of the invention are set forth in the appended claims. The best mode for carrying out the invention and its particular features and advantages can be better understood by referring to the following detailed description, read together with the accompanying drawings, in which:

DETAILED DESCRIPTION OF ILLUSTRATIVE EMBODIMENTS

Figure 1:
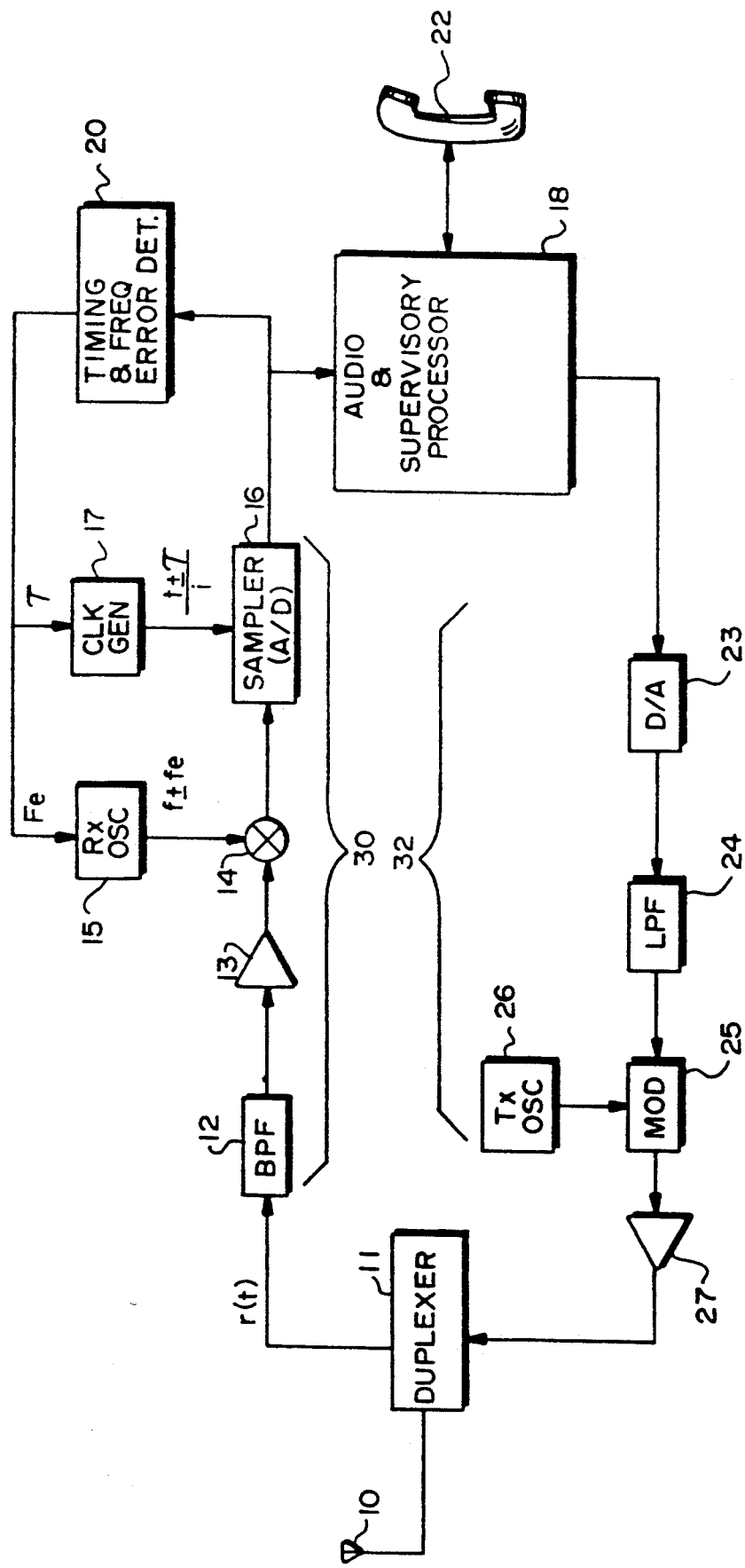
FIG. 1 is a block diagram of a cellular telephone transceiver in which the invention may be used.

FIG. 1 shows a transceiver for modulated digital signals, such as those generated in a time division multiple access (TDMA) cellular system. The illustrated transceiver includes a antenna 10 and duplexer 11 which provide a received radio frequency (RF) signal, r(t), to a receiver 30. The receiver 30 includes a low noise amplifier 13, mixer 14, receiver local oscillator 15, sampler 16, sample clock generator 17, and a timing-and-frequency-error detector 20.

An audio-and-supervisory signal processor 18 provides an audio frequency analog signal to an ear piece in a handset 22, by decoding digital encoded voice samples as well as receive call control information in the output of the sampler 16. The decoding of audio and supervisory information is in accordance with known TDMA cellular specifications, such as the EIA IS-54 Dual Mode Specification of the Electronic Industries Association, or other digital cellular operating standards. In any event, the decoded voice samples are converted to analog form and provided to an ear piece of the handset 22.

In the transmit direction, a microphone in the handset 22 provides an audio signal to the signalling processor 18, which in turn presents an encoded digital signal, combined with transmit supervisory control signals, to a transmitter 32. The transmitter 32 includes a D/A converter 23, low pass filter 24, radio frequency modulator 25, transmitter 26 and power amplifier 27. The output signal from the power amplifier 27 is in turn presented to the duplexer 11 and the antenna 10 for transmission.

The present invention is concerned with the synchronization and timing of the receiver 30, and in particular, with the operation of the timing-and-frequency-error detector 20, which provides frequency control of the receiver local oscillator 15 and timing control of the sample clock generator 17.

Consider that the signal output by the receiver local oscillator 15 ideally has a frequency, f, which is identical to the carrier frequency of the received radio frequency (RF) signal, r(t). However, in any given receiver 30, the actual frequency of the receiver local oscillator 15 may vary over a range from $f-f_e$ to $f+f_e$, where $f_e$ represents instantaneous frequency error in the receiver local oscillator 15. The function of the timing-and-frequency-error detector 20 is thus to provide an estimate of $f_e$ to the receiver local oscillator 15, which in turn adjusts the frequency of the signal fed to the mixer 14.

The instantaneous symbol sampling error, $\tau$, of the sampler 16 may also vary, from $-T/2$ to $+T/2$, where T is a nominal time between successive transmitted symbols in signal r(t). This is so because in the preferred embodiment of the invention, samples are taken at twice the symbol rate, in order to minimize the signalling bandwidth of the various components of the receiver 30. However, it is also possible to take more than two samples per symbol period, in which case the maximum sample timing error will range from $-T/i$ to $+T/i$, where i is the number of samples taken per symbol.

The timing-and-frequency-error detector 20 also provides an estimate of $\tau$ to the sample clock generator 17, so that the timing of successive samples taken by the sampler 16 may be adjusted in order to maximize the probability of correct symbol detection by the receiver 30.

Figure 2:
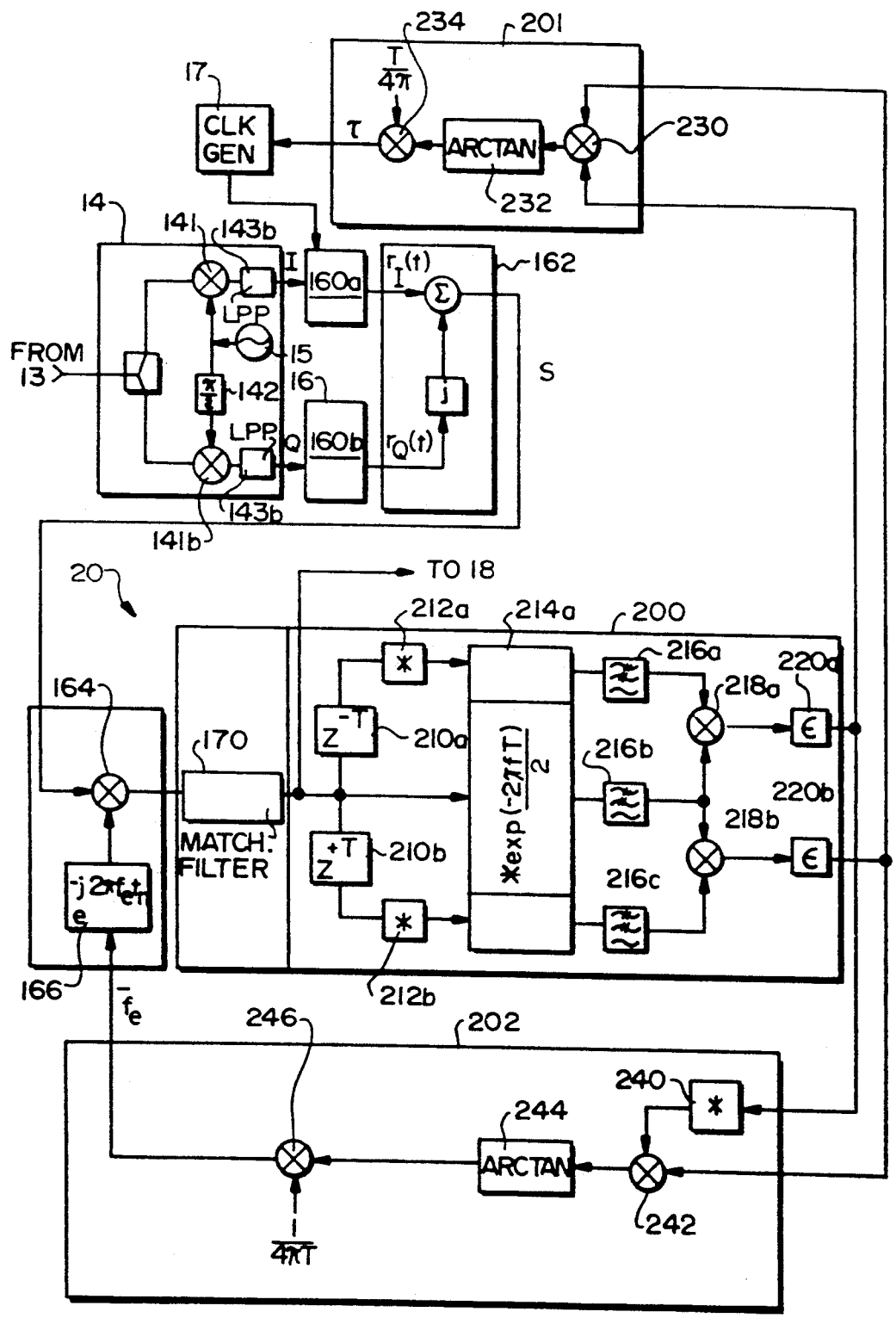
FIG. 2 is a block diagram of the symbol timing and carrier frequency error correction technique according to the invention.

FIG. 2 is a more detailed view of the preferred embodiment of the timing-and-frequency-error detector 20 and the portions of the receiver 30 to which it is connected, showing the novel features of the invention more clearly. The mixer 14 includes a power splitter 140, a pair of mixers 141a, 141b, a phase shifter 142, and a pair of anti-aliasing filters 143a, 143b, which encompass a conventional quadrature demodulator which accepts an incoming RF signal, r(t), from the low noise amplifier 13, and provides baseband in-phase (I) and quadrature (Q) signals at its output.

In particular, r(t) is first fed to the splitter 140, which provides two signal paths to the pair of mixers 141a, 141b. A local reference carrier signal provided by the receiver local oscillator 15 is directly connected to mixer 141a; the phase shifter 142 provides a $\pi/2$, or 90° phase shift in the local reference carrier signal fed to the other mixer 141b. The low pass filters 143a, 143b remove the twice carrier frequency components generated by the mixers 141a, 141b, to prevent aliasing by the sampler 16, as well as to limit the effect of wideband noise.

Although the mixer 14 is shown as having a single pair of mixers 141a, 141b which directly convert the incoming RF signal r(t) to baseband, it should be understood that in certain systems, additional mixers (not shown) may be used to first step the RF carrier down to one or more intermediate frequencies.

The sampler 16 is a pair of analog-to-digital (A/D) converters 160a, 160b, with one A/D for each of the I and Q channels. Digital samples provided by the converters 160a, 160b are then combined by combiner 162, which formats the two samples such that they are considered to be a single, complex-valued sample, S, of r(t), with the I channel sample considered to be the real part of complex-valued sample S, and the Q channel sample as the imaginary part of complex-valued sample S.

Next, the correction of local oscillator frequency, f, is made by introducing a phase shift in the complex sample S. That is, the result of a frequency offset, $f_e$, in the output of the receiver local oscillator 15 is a corresponding phase offset in the complex sample, S, of $f_e \cdot t_n$, where $t_n$ indicates discrete time. This phase offset can be removed by multiplying by a sinusoidal signal of complex frequency $e^{-j(2\pi f_e \cdot t_n)}$. In the preferred embodiment, the frequency correction is implemented by a discrete-time multiplier 164, which multiplies the complex sample S by the appropriate sinusoid generated by signal generator 166. However, it is also possible to effect the $f_e$ correction directly in the analog receiver local oscillator 15 by adjusting its carrier frequency, as indicated by the dashed line from the multiplexer 246 to the mixer 15 in FIG. 2.

A matched filter 170 is typically required in most practical digital signal receivers. As is well known in the art, the parameters of the matched filter 170 are chosen to match the transmitted pulse shape, as imposed by the typically sharp cut-off transmit filters 24 (FIG. 1) used to minimize transmission bandwidth.

The output of the matched filter 170 is thus a series of baseband, filtered samples of the incoming signal r(t), which are further processed by the signal processor 18.

The output of the matched filter 170 is also fed to the timing-and-frequency-error detector 20, to generate the $f_e$ and $\tau$ estimates, according to the invention, through the use of a non-linear operator 200, a timing error detector 201, and a frequency error detector 202.

The non-linear operator 200 is shown in FIG. 2 as dual cyclic correlators, with one correlator being temporally advanced, and the other being temporally delayed. The illustrated non-linear operator 200 thus consists of one-symbol-period delays or advances 210a, 210b, conjugators 212a, 212b, three multipliers 214a, 214b, 214c, three low-pass filters 216a, 216b, 216c, a pair of multipliers 218a, 218b, and a pair of averagers 220a, 220b.

The non-linear operator 200 provides two signals, $C_+$ and $C_-$. $C_+$ is a first composite signal having phase components of interest at the positive of the symbol frequency, $f_T$. A first phase component of $C_+$ varies with respect to the relative carrier frequency error, $f_e$; a second phase component is related principally to the symbol timing error, $\tau$. A third, constant component equal to $\pi$ radians is also present in $C_+$.

The first composite signal, $C_+$, thus takes the form of $$C_+ = K_1 e^{j 2\pi (f_e \cdot T - \tau/T + \frac{1}{2})},$$

where $K_1$ is a constant, and $f_e$, T and $\tau$ are defined as previously.

The second composite signal, $C_-$, also has phase components of interest; however, these appear at the negative of the symbol rate, $-f_T$. $C_-$ is given by $$C_- = K_2 e^{j 2\pi (-f_e \cdot T - \tau/T + \frac{1}{2})},$$

where $K_2$ is another constant; $C_-$ thus also has two phase components which are related to $f_e$ and $\tau$.

In other words, $C_+$ is a signal having a first phase component related to the ratio of the demodulator frequency error to the symbol clock rate, and a second phase component related to the negative ratio of the timing error to the clock interval. Likewise, $C_-$ also has two phase components of interest, with the first component being related to the ratio of the negative of the demodulator frequency error to the clock rate, and the second component being the negative ratio of the timing error to the clock interval.

Returning to FIG. 2, $C_+$ is generated by multiplying the received signal of interest by a time-shifted and conjugated version of itself. Delay 210a and conjugator 212a provide conjugated complex-valued samples delayed by a single symbol period, T; the multiplier 218a performs the multiplication.

The $C_-$ correlator, being similar, consists of delayer 210b and conjugator 212b which provide a conjugated complex-valued sample advanced by a symbol period, T. Multiplier 218b performs the second correlation.

Preferably, before the multiplication, the multipliers 214a and 214b are first used to shift the phase components of interest in $C_+$ which would otherwise appear at the symbol frequency, $f_T$, to zero frequency, or DC. As for the $C_+$ correlator, the multipliers 214b and 214c shift the components of interest in $C_-$ to DC.

By having the phase components of interest in the $C_+$ and $C_-$ signals appear directly at or near DC, the sampling rate and bandwidth required of the digital filters 216a and 216b and 216c is greatly relaxed, since they can then be implemented as easier-to-implement, low-pass digital filters instead of bandpass filters.

This order of operations is critical if minimum rate, Nyquist sampling is to be achieved. That is, in order to minimize the sampling rate, and thus operating frequency of the components of the timing-and-frequency-error detector 20, it is preferred that the frequency shift performed by blocks 214a, 214b, 214c be performed before the filtering 216a, 216b, 216c and correlation by multipliers 218a, 218b.

The averagers 220a, 220b assists in obtaining timing and frequency error estimates having accurate means and low variances; averaging is preferably performed over several tens or hundreds of symbol periods. The averaging functions 220a, 220b can also be partially performed by an additional averaging circuit connected to the output of the multipler 246.

The remainder of the blocks shown in FIG. 2 are concerned with extracting $f_e$ and $\tau$ from the composite signals $C_+$ and $C_-$.

The timing error detector 201 extracts the timing error, $\tau$, from $C_+$ and $C_-$ by multiplying them together in block 230, performing an arc-tangent operation in block 232, and then removing a constant frequency offset of $4\pi$ in block 234. (It should be noted that while the operation in block 232 is referred to herein as an arc-tangent, it is actually a complex-valued argument operation which returns a non-ambiguous angle in radians, from $-\pi$ to $\pi$.

To understand why $\tau$ can be extracted in this way, consider that the expressions for $C_+$ and $C_-$ can be written as $$C_+ = e^{j(\theta 1 - \theta 2)}, \text{ and}$$

$$C_- = e^{j(-\theta - \theta 2)},$$

where $$\theta_1 = 2\pi \cdot f_e \cdot T, \text{ and}$$

$$\theta_2 = 2\pi \cdot \tau/T + \pi,$$

so that $$C_+ \cdot C_- = e^{j(2 \cdot \theta_2)}.$$

Thus, the arc-tangent operation performed by block 232 extracts a signal equal to twice $\theta_2$; since $$2\theta_2 = 4\pi \tau/T,$$

the multiplication by T divided by $4\pi$ in block 234 removes all but $\tau$.

Similarly, the frequency error extractor 202 extracts the frequency error, $f_e$, from $C_+$ and $C_-$ by using a multiplier 242 to multiply $C_-$ by the conjugate of $C_+$. An arc-tangent operation in block 244, and constant frequency offset of $4\pi$ divided by the sampling interval results in the detection of just $f_e$. This can be better understood by considering that $$C_+ \cdot C_- = e^{j(2 \cdot \theta_1)}, \text{ and}$$

$$2\theta_1 = 4\pi \cdot f_e \cdot T.$$

Figure 3:
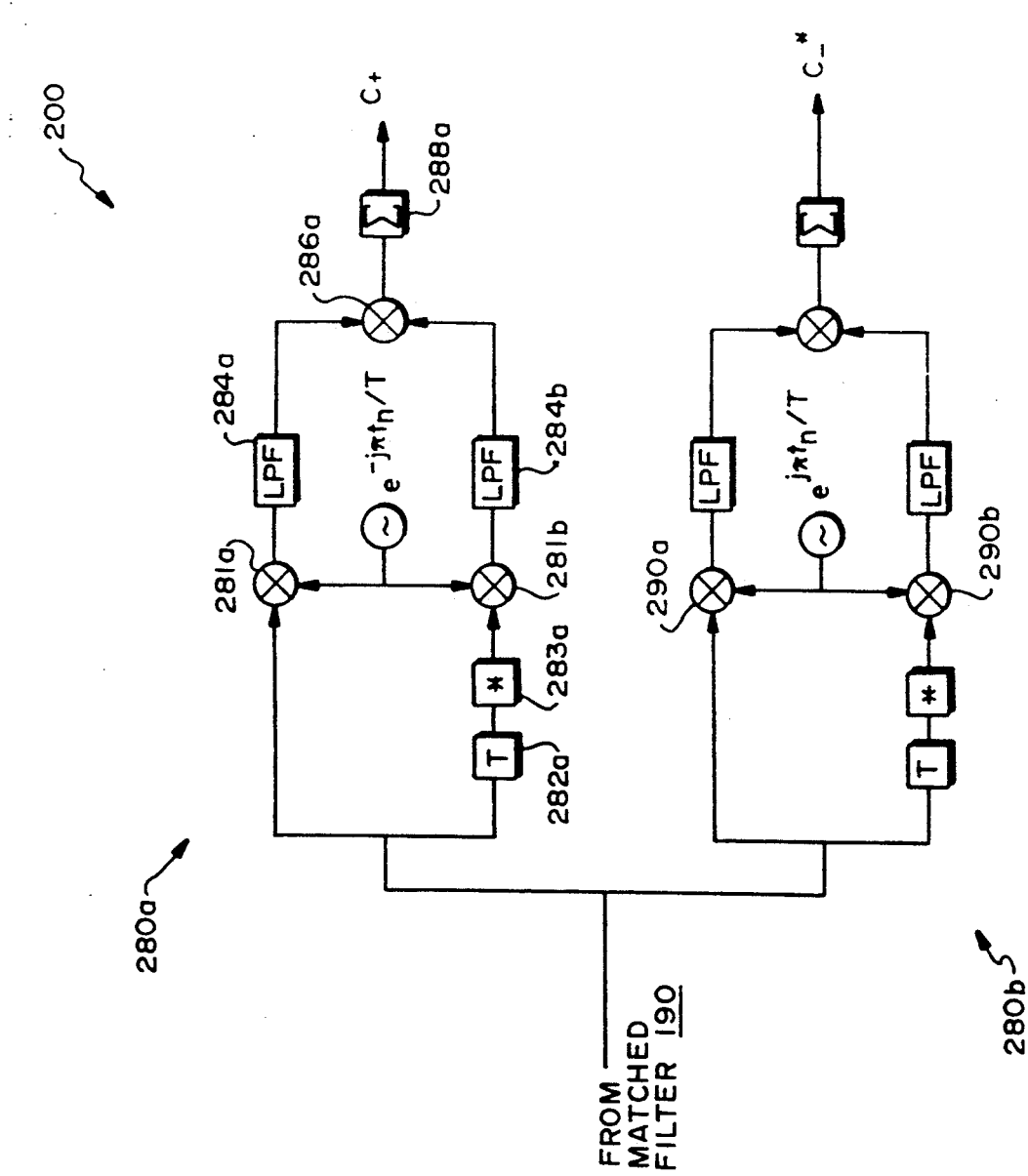
FIG. 3 is an alternate embodiment of the correlators shown in FIG. 2.

FIG. 3 is an alternate embodiment of the non-linear operation performed in 200. In this embodiment, the two correlators 280a and 280b are independent of one another. In the first correlator, a complex-valued sample from the matched filter 170 is fed to a delay 282a and conjugator 283a to provide a delayed and conjugated version of the phase component of interest. The multipliers 281a, 281b shift the phase component of interest at the positive symbol rate, $f_T$, to a zero frequency, or DC. Filters 284a, 284b are selected as in the FIG. 2 embodiment before multiplication by the multiplier 286a to obtain the correlator output. An averager 288a provides $C_+$ at its output.

The second correlator 280b is similar, with the exception that the phase components of interest at the negative of the symbol rate, $-f_T$, are shifted to DC by the multipliers 290a, 290b.

Figure 4:
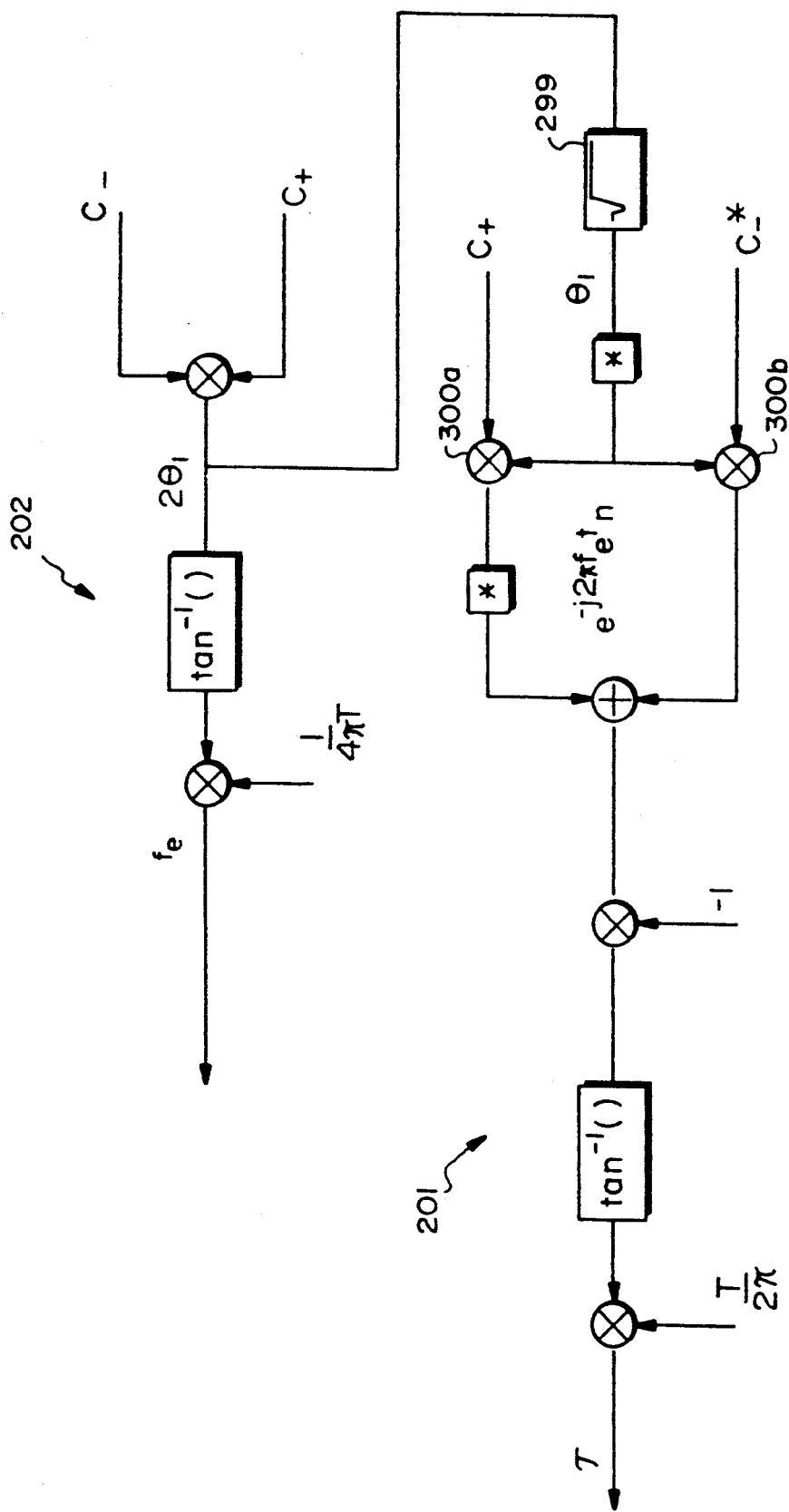
FIG. 4 is an alternate embodiment of the timing error component and frequency error component detectors shown in FIG. 2.

FIG. 4 is an alternate embodiment of the timing error detector 201 and frequency error detector 202. The frequency error detector 202 is similar to that described in connection with FIG. 2, with the exception that the intermediate term, $2\theta_1$, is made available to be used by the timing error detector 202 directly.

The frequency error detector 202 provides an estimate of $\theta_1$, at the output of a square root operator 299, which is then used by the remainder of the timing error detector 201 to extract $\theta_2$. As shown, this is accomplished by first removing the portion of the phase of the sample values due to frequency offset from each of the $C_+$ and $C^*_-$ by the multipliers 300a, 300b. The output of multiplier 300a is then conjugated and added to the output of multiplier 300b; the negative phase of the result of this operation is then multiplied by $-1$ and the resulting phase is then multiplied by $T/2\pi$ to obtain an estimate of the timing error, $\tau$.

This embodiment avoids the introduction of an additional phase ambiguity, by avoiding the doubling of the phase term containing $\tau/T$. This can be seen by recalling that $\tau$ can vary over an entire symbol period, from $-T/2$ to $+T/2$, as previously described. When the $\tau/T$ term is then multiplied by $2\pi$, this term then varies from $-\pi$ to $+\pi$. The arc tangent operation can then be used to unambiguously determine $\tau/T$, which is not the case if this phase term is doubled first (i.e., if it is first multiplied by $4\pi$ instead of $2\pi$) as was done in the FIG. 2 embodiment by block 234.

A computer simulation of the invention was performed which began with a frequency deviation, $f_e$, equal to 2% of the symbol rate, and a timing deviation, $\tau$, equal to $\frac{1}{8}$ of a symbol period. It was determined that, for the noise-free case, $\tau$ would be adequately corrected in 500 or fewer sample periods, and that the frequency error, $f_e$, would be adequately corrected in 1000 or fewer sample periods. These results are consistent with the requirements placed upon TDMA cellular transceivers, which must be capable of operating in fast multipath fading environments.

Figure 5:
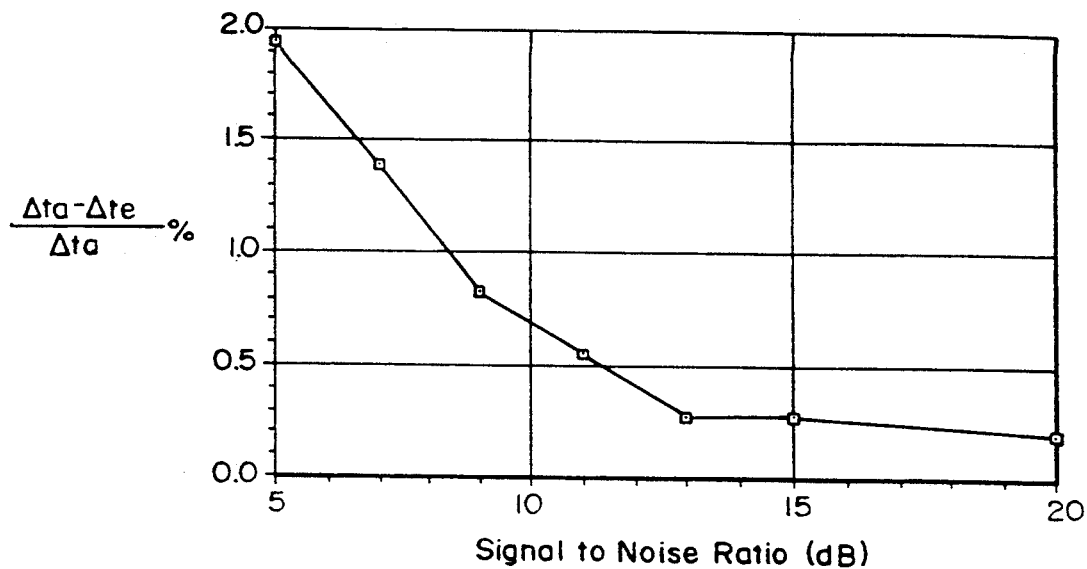
FIGS. 5 and 6 are the results of a computer simulation of the inventive timing and frequency error correction technique, using a multipath fading channel model, showing the effect of up to a 20 decibel (dB) signal to noise ratio on the accuracy of the timing and frequency estimation, respectively.
Figure 6:
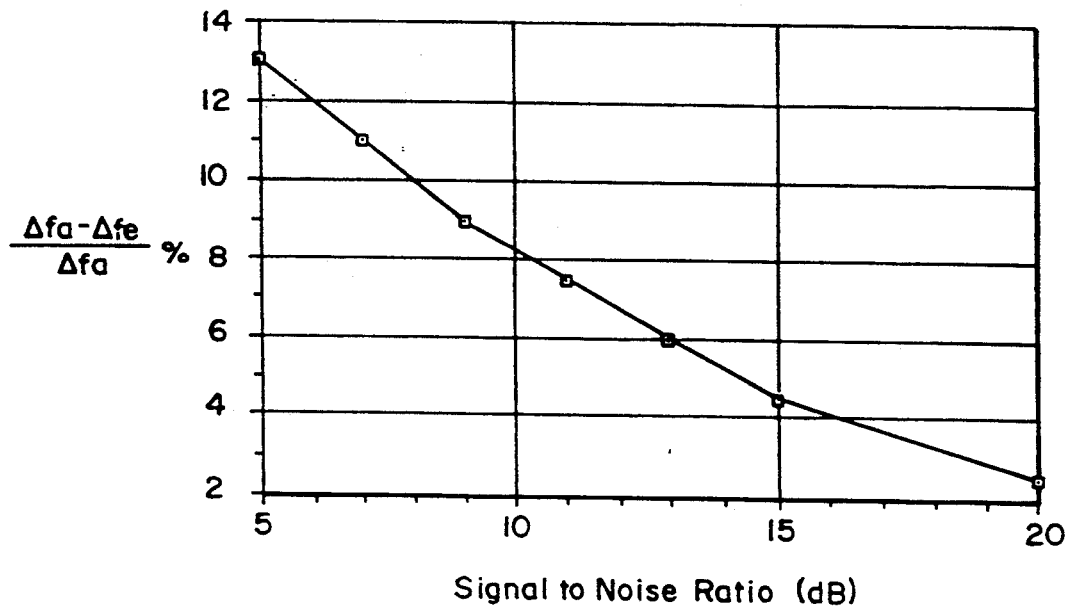

FIGS. 5 and 6 show the results of a computer simulation of the invention, which illustrate the effect of noise power on the frequency and timing error estimates over 2500 symbol periods. The simulation used a two-ray, T-delay spread, Rayleigh faded signal channel model. It can be seen that the timing error estimation process is much less susceptible to noise than the frequency error estimation process.

Figure 7:
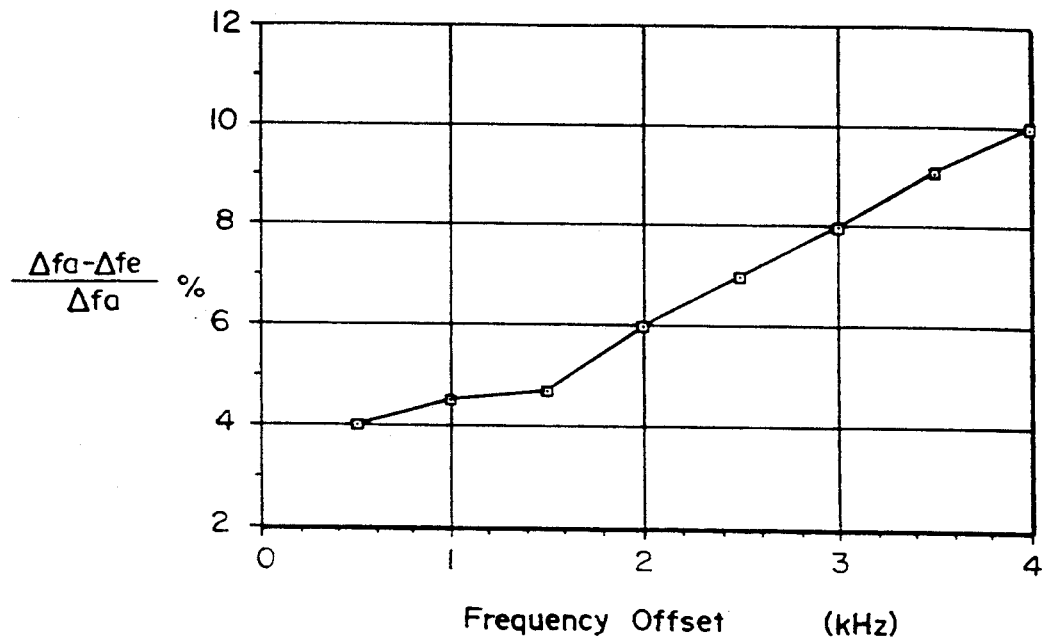
FIGS. 7 and 8 are also the results of a computer simulation, and show the effect of carrier frequency offset on the frequency and timing estimation according to the invention.
Figure 8:
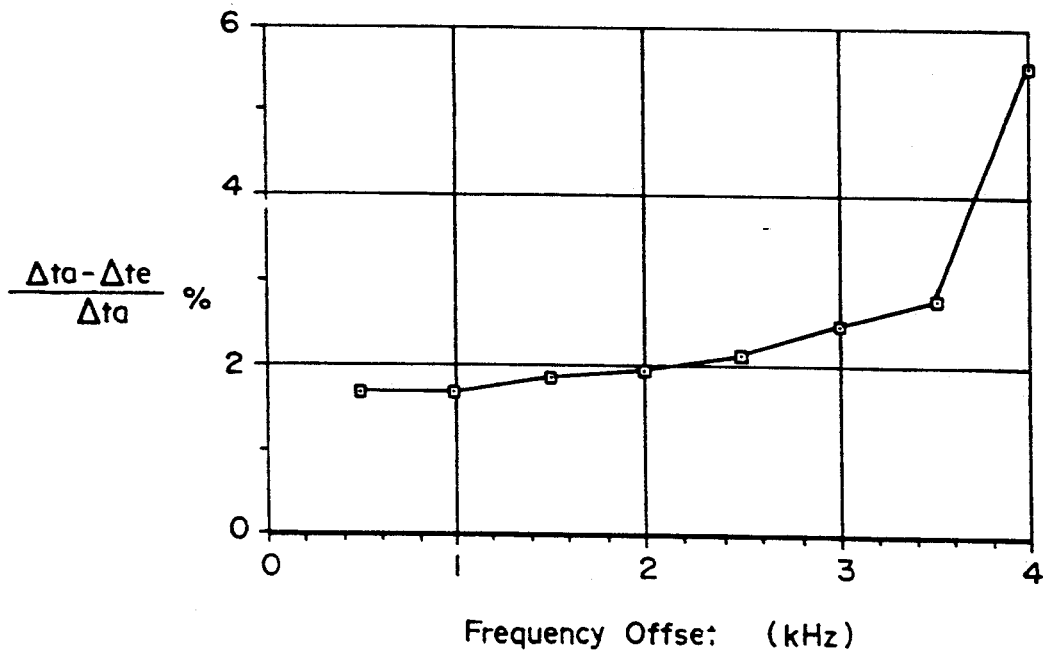

FIGS. 7 and 8 show the effect of frequency offset on the timing and frequency error estimation process. It is clear that the deviation of the estimated timing offset from the actual timing offset is negligible until a certain frequency error threshold is reached, which principally depends upon the bandwidth of the filters in block 200. Thus, the bandwidth of these filters may be adjusted to achieve a desired accuracy in the $f_e$ estimate.

The components of the timing-and-frequency-error detector 20 which have been described are thus typically implemented as suitable discrete-time signal processing circuits which operate on the complex sample value S. They may be embodied in appropriate digital hardware registers, accumulators, and other arithmetic logic circuits, or in a suitably programmed digital signal processor, as will be understood by one of skill in the art of designing digital signal processors.

The foregoing description has been limited to several specific embodiments of the invention. It will be apparent, however that variations and modifications be made to the invention with the attainment of some or all of its advantages. For example, although the invention has been described in connection with TDMA cellular receivers, it may be used to recover any type of digitally modulated signal. In addition, although it has been described as being implemented with digital logic, it can also be implemented by using any other discrete-time signal processing components. Therefore, it is the object of the appended claims to cover all such variations and modifications that come within the true spirit and scope of the invention.

What is claimed is:

1. A method for correcting the symbol sampling time and carrier frequency error in a received modulated digital signal, comprising the steps of:

demodulating the modulated digital signal, by mixing it with a local reference oscillator to provide a baseband signal;

sampling the baseband signal to provide discrete-time, in-phase (I) and quadrature (Q) components thereof;

performing a first non-linear operation on the I and Q components, to produce a first composite signal having a first phase component related to a symbol timing error and a second phase component related to a carrier frequency error;

performing a second non-linear operation on the I and Q components, to produce a second composite signal having a first phase component related to the symbol timing error and a second phase component related to the negative of the carrier frequency error;

detecting the symbol timing error by comparing the first and second composite signals;

detecting the carrier frequency error by comparing the first and second composite signals;

adjusting the time of subsequent sampling steps according to the detected symbol timing error; and adjusting the frequency of the I and Q components according to the detected carrier frequency error.

2. A method as in claim 1 wherein the first non-linear operation is a cyclic correlation.

3. A method as in claim 1 wherein the first non-linear operation is multiplication of a present I and Q component and a complex conjugate of an I and Q component time-delayed by a symbol period.

4. A method as in claim 1 wherein the second non-linear operation is a cyclic correlation.

5. A method as in claim 1 wherein the first non-linear operation is multiplication of a present I and Q component and a complex conjugate of an I and Q component time-advanced by a symbol period.

6. A method as in claim 1 additionally comprising the step of, after the sampling step:

frequency shifting the I and Q components so that they appear at a frequency of zero.

7. A method as in claim 1 wherein the step of adjusting the frequency of the I and Q components is performed after the step of sampling the baseband signal.

8. A method as in claim 1 wherein the step of adjusting the frequency of the I and Q components is performed by using a discrete-time multipler to multiply the I and Q components by a sinusoid having a frequency equal to the detected carrier frequency error.

9. A method as in claim 1 wherein the local oscillator is an adjustable oscillator and the step of adjusting the frequency of the I and Q components is performed by adjusting the local oscillator frequency by an amount indicated by the detected carrier frequency error.

10. A method for correcting the symbol sampling time and carrier frequency error in a received modulated digital signal, comprising the steps of:

taking samples of the modulated digital signal in synchronism with a local clock reference signal, to provide discrete time, in-phase (I) and quadrature (Q) components of the modulated digital signal;

performing a first non-linear operation on the I and Q components, to produce a first composite signal having a first phase component related to a symbol timing error and a second phase component related to a carrier frequency error;

performing a second non-linear operation on the I and Q components, to produce a second composite signal having a first phase component related to the symbol timing error and a second phase component related to the negative of the carrier frequency error;

detecting the symbol timing error by comparing the first and second composite signals;

detecting the carrier frequency error by comparing the first and second composite signals; and adjusting subsequent I and Q components by the steps of:

adjusting the I and Q components by adjusting the timing of the local reference clock signal by an amount indicated by the symbol timing error; and adjusting the frequency of the I and Q components by multiplying the I and Q components by a sinusoid having a frequency equal to the detected carrier frequency error.

11. A method for correcting the symbol sampling time and carrier frequency error in a received modulated digital signal, comprising the steps of:

generating a digital clock reference signal;

taking samples of the modulated digital signal in synchronism with the local clock reference signal, to provide discrete time, in-phase (I) and quadrature (Q) components of the modulated digital signal;

forming complex-valued signal components (S) by combining the I and Q components, with the I component being the real part of the complex-valued sample S, and the Q component being the imaginary part of the complex-valued sample S;

introducing a phase shift in the complex-valued sample S to compensate for a frequency error, $f_o$, in the digital clock reference signal, the phase shift being introduced by discrete-time multiplying the complex-valued sample S by a digital complex sinusoid having a complex frequency $e^{-j(2\pi f_e t n)}$, where $t_n$ indicates discrete time;

introducing a timing correction in the digital clock reference signal, by adjusting the time at which the samples are taken by an amount equal to a timing error, $\tau$;

estimating the frequency error, $f_o$, and the timing error, $\tau$, in the digital clock signal, by performing the steps of:

multiplying each of the complex-valued samples, S, by a time-shifted and conjugated of itself, to provide a first correction signal, $C_+$, having a first phase component related to the frequency error $f_o$ divided by a nominal interval T between successive samples, and also having a second phase component related to the negative ratio of the timing error $\tau$ and the sample interval T;

multiplying each of the complex-valued samples, S, by a time-shifted and conjugated of itself, to provide a second correction signal, $C_-$, having a first phase component related to the negative of the frequency error $f_o$ divided by the nominal interval T, and also having a second phase component related to the negative ratio of the timing error $\tau$ and the interval T between successive samples;

detecting the timing error, $\tau$, by multiplying the first correction signal $C_+$ by the second correction signal $C_-$ and determining the arc tangent thereof; and detecting the frequency error, $f_o$, by multiplying the conjugate of the first correction signal $C_+$ by the second correction signal $C_-$ and determining the arc tangent thereof.

12. A method as in claim 11 wherein the step of detecting the frequency error $f_o$ additionally comprises the steps of;

determining a conjugate-square-root of the product of the first correction signal $C_+$ and the second correction signal $C_-$;

multiplying the conjugate-square-root by the first correction signal $C_+$, to obtain a first multiplied signal;

multiplying the conjugate-square-root by the second correction signal $C_-$, to obtain a second multiplied signal;

summing the first and second multiplied signals; and determining the arc tangent of the first and second multiplied signals.

* * * * *